(12) United States Patent
Dickenson et al.

(10) Patent No.: US 7,810,081 B2
(45) Date of Patent: Oct. 5, 2010

(54) COMPILATION ERROR ISOLATION, OPTIMIZATION AND RESOLUTION

(75) Inventors: Marc A. Dickenson, Austin, TX (US); John D. Upton, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 1079 days.

(21) Appl. No.: 11/466,119

(22) Filed: Aug. 22, 2006

(65) Prior Publication Data

US 2008/0052695 A1 Feb. 28, 2008

(51) Int. Cl.
*G06F 9/45* (2006.01)
*G06F 11/00* (2006.01)
*H04L 1/00* (2006.01)

(52) U.S. Cl. ............... 717/140; 717/143; 717/151; 717/139; 717/141; 714/38; 714/799

(58) Field of Classification Search ............ 717/140
See application file for complete search history.

(56) References Cited

U.S. PATENT DOCUMENTS

| 4,039,813 | A | 8/1977 | Kregness |
| 5,313,387 | A | 5/1994 | McKeeman et al. |
| 5,673,390 | A | 9/1997 | Mueller |
| 5,859,963 | A | 1/1999 | O'Dowd et al. |
| 6,072,951 | A | 6/2000 | Donovan et al. |
| 6,115,544 | A | 9/2000 | Mueller |
| 6,886,114 | B2 * | 4/2005 | Parry .................... 714/48 |
| 7,496,906 | B2 * | 2/2009 | Black-Ziegelbein et al. .. 717/145 |
| 2001/0047510 | A1 | 11/2001 | Angel et al. |
| 2004/0078687 | A1 * | 4/2004 | Partamian et al. ............ 714/38 |

FOREIGN PATENT DOCUMENTS

JP 04-317134 A 11/1992

* cited by examiner

*Primary Examiner*—Thomas K Pham
(74) *Attorney, Agent, or Firm*—Dillon & Yudell LLP

(57) ABSTRACT

A method, system and computer program product for performing error correction are disclosed. The method includes performing on source code a selected compilation operation from among a set of compilation operations and, responsive to encountering an error in the selected compilation operation, running an error handler to isolate the error utilizing data logged for the compilation operation. Responsive to determining that the error handler has not sufficiently isolated the error, a source code modifier is run to modify a portion of the source code selected by reference to the data logged for the compilation operation.

20 Claims, 2 Drawing Sheets

COMPILATION ERROR ISOLATION, OPTIMIZATION AND RESOLUTION

BACKGROUND OF THE INVENTION

1. Technical Field

The present invention relates in general to data processing and in particular to software compilation. Still more particularly, the present invention relates to a system, method and computer program product for performing error isolation and correction.

2. Description of the Related Art

A compiler compiles a software module from source code to executables, with some error isolation, making the executables available for execution on an instruction set simulator (ISS). After each compilation step, such as lexical analysis, preprocessing, or code generation, prior-art compilers determine whether an error has been encountered. If a prior-art compiler determines that no error was encountered in a step, then the compiler executes the next step of the compilation process. If, however, the compiler determines that an error was encountered in a previous step, then the compiler runs an error handler.

Unfortunately, even when facing minor errors, prior-art compilers are often unable to identify and isolate problems as simple as a missing bracket. A known solution to many code compilation issues is to use an editor with syntax highlighting, which can aid the user in spotting certain types of compilation problems. Unfortunately, this solution does not address the root cause of the problem, namely that the error was insufficiently isolated during the compilation step. After an error handler has run, prior-art compilers can report failures that are misleading or imprecise. No truly effective method for error isolation, optimization, and resolution exists.

SUMMARY OF THE INVENTION

A method, system and computer program product for performing error correction are disclosed. The method includes performing on source code a selected compilation operation from among a set of compilation operations and, responsive to encountering an error in the selected compilation operation, running an error handler to isolate the error utilizing data logged for the compilation operation. Responsive to determining that the error handler has not sufficiently isolated the error, a source code modifier is run to modify a portion of the source code selected by reference to the data logged for the compilation operation.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed descriptions of an illustrative embodiment when read in conjunction with the accompanying drawings, wherein:

DETAILED DESCRIPTION OF THE PREFERRED EMBODIMENT

The present invention provides a method, system, and computer program product for performing error isolation, optimization and resolution during compilation. The present invention provides a compiler that performs steps of the compiling process until an error is encountered, and then, in cases where the error-causing code is not sufficiently isolated, modifies, adds, or removes a portion of the code being compiled in an attempt to isolate the location of the code causing the error. The present invention then resumes compilation and determines if compilation succeeds with proposed modifications. By iterating a configurable number of times, the present invention provides superior error isolation and correction during compilation.

The present invention reduces the volume of error report messages seen in the prior art, which are at times cryptic and are not always specific as to the exact nature of the underlying problem. Using the present invention, compilers need not report thousands of unrelated error codes and failures when there potentially are only one or two actual problems in the source code. The performance of a marginal amount of additional compiler operation by the present invention saves the user a substantial amount of time. Because of the high value of development time spent on compiling and debugging problems, the present invention improves efficiency by reducing the time spent needlessly investigating cryptic or misleading error messages through better error report isolation and correction of compilation failures.

Figure 1:
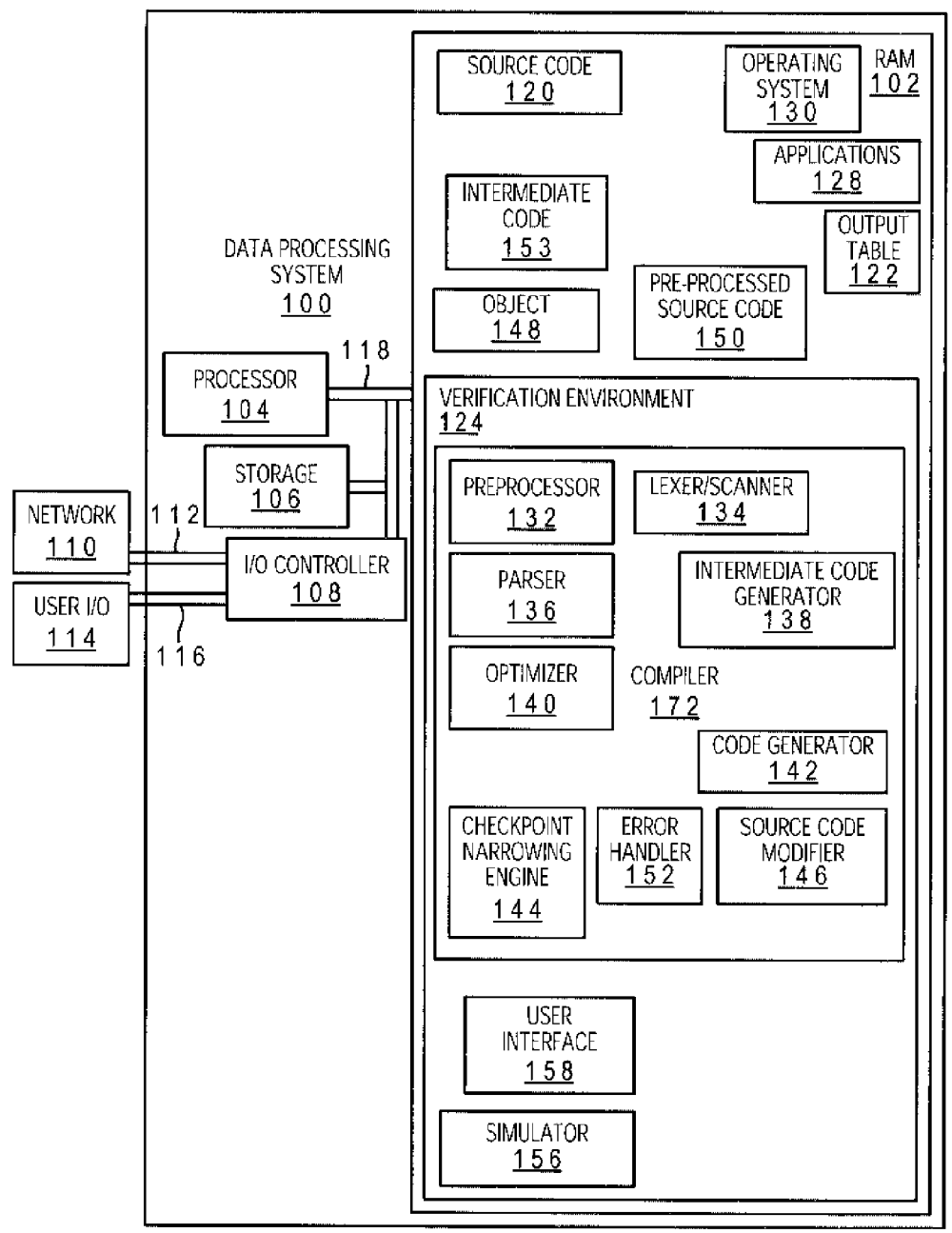
FIG. 1 depicts a block diagram of a general-purpose data processing system with which the present invention of a method, system and computer program product for performing error isolation, optimization and resolution may be executed.

With reference now to the figures, and in particular with reference to FIG. 1, a block diagram of a general-purpose data processing system, in accordance with a preferred embodiment of the present invention, is depicted. Data processing system 100 contains a processing storage unit (e.g., RAM 102) and a processor 104. Data processing system 100 also includes non-volatile storage 106 such as a hard disk drive or other direct-access storage device. An Input/Output (I/O) controller 108 provides connectivity to a network 10 through a wired or wireless link, such as a network cable 112. I/O controller 108 also connects to user I/O devices 114 such as a keyboard, a display device, a mouse, or a printer through wired or wireless link 116, such as cables or a radio-frequency connection. System interconnect 118 connects processor 104, RAM 102, storage 106, and I/O controller 108.

Within RAM 102, data processing system 100 stores several items of data and instructions while operating in accordance with a preferred embodiment of the present invention. These include source code 120, which is under compilation, and an output table 122, for recording results of interaction with a verification environment 124. Other applications 128 and verification environment 124 interface with processor 104, RAM 102, I/O control 103, and storage 106 through operating system 130. Verification environment 124 contains a compiler module 172, a simulator module 156, and a user interface module 158. User interface module 158 allows for control of compiler module 172, which translates higher-level languages into machine-language executable code, which is then executed within simulator module 156.

Source code 120 contains a series of instructions written in a human-readable computer programming language, such as C++. In modern programming languages, the source code 120 that represents a program is usually stored in a grouping of several text files. Source code 120 is converted from human-readable form to an equivalent computer-executable form by compiler 172.

Compiler 172 contains a preprocessor 132, a lexer/scanner 134, a parser 136, an intermediate code generator 138, an optimizer 140, a code generator 142, a source code modifier 146, an error handler 152 and a checkpoint narrowing engine 144. RAM 102 additionally contains intermediate code 153 generated by intermediate code generator 138, an object 148 generated by code generator 142 and pre-processed source code 150 generated by preprocessor 132. Checkpoint narrowing engine 144 interacts with preprocessor 132, lexer/scanner 134, parser 136, intermediate code generator 138, optimizer 140, code generator 142, error handler 152 and source code modifier 146 in order to track the efficiency of compilation and record data, which later may allow source code modifier 146 to determine the proper lines to change or modify during one of N iterative recompilations.

Preprocessor 132 is a program routine within compiler 172 that processes its input data from source code 120 to produce output that is used as input to another program routine, such as lexer/scanner 134. Pre-processed source code 150 is the output of preprocessor 132.

Lexer/scanner 134 performs two functions, which are often integrated for efficiency reasons, allowing the functions to be performed on pre-processed source code 150 by lexer/scanner 134 in parallel. The first function of lexer/scanner 134, called scanning, is usually based on a finite state machine. During scanning, lexer/scanner 134 gathers information on the possible sequences of characters that can be contained within pre-processed source code 150. Individual instances of these character sequences within pre-processed source code 150 are known as lexemes. For instance, an integer token within preprocessed source code 150 may contain any sequence of numerical digit characters. In many cases, the first non-whitespace character within pre-processed source code 150 can be used by lexer/scanner 134 to deduce the kind of token that follows; the input characters are then processed one at a time by lexer/scanner 134 until lexer/scanner 134 reaches a character that is not in the set of characters acceptable for that token (under a scheme known as the maximal munch rule). In some languages, the lexeme creation rules of lexer/scanner 134 are more complicated and may involve backtracking over previously read characters.

The second function of lexer/scanner 134 is lexical analysis, which is the name given to the processing of an input sequence of characters (such as the source code of a computer program) to produce, as output, a sequence of symbols called "lexical tokens", or just "tokens". For instance, lexers for many programming languages will convert the character sequence "123 abc" into the two tokens "123" and "abc". Lexer/scanner 134 then forwards these tokens as input to parser 136.

Parser 136 analyzes an input sequence (read from a file created by lexer/scanner 134) in order to determine its grammatical structure with respect to a given formal grammar. Parser 136 transforms input text created by lexer/scanner 134 into a data structure, usually called a tree, which is suitable for later processing and which captures the implied hierarchy of the input. Generally, parser 136 operates in two stages, first identifying the meaningful tokens in the input, and then building a parse tree from those tokens.

Code generator 142 converts a syntactically-correct version of source code 120 received from parser 136 into intermediate code 153 containing a series of instructions that could be executed or interpreted by a machine. In some embodiments of the present invention, sophisticated compilers 172 use several cascaded code generation stages within code generator 142 to fully compile intermediate code 153. Cascaded code generation leverages the fact that algorithms for code optimization within code generator 142 are more readily applicable to intermediate code 153, and also facilitates a single compiler 172 that can target multiple architectures.

The input to code generator 142 consists of a parse tree from parser 136. Because the target machine may be a physical machine such as a microprocessor, or an abstract machine such as a virtual machine, or an intermediate language (human-readable code), the output of code generator 142 can selectably be objects 148 of machine code, assembly code, code for an abstract machine (like JVM), or anything between.

Checkpoint narrowing engine 144 records a continuous log of compilation results, including whether or not error isolation is being improved or worsened during an iteration, in output table 122. For the current compilation, checkpoint narrowing engine 144 logs checkpoints in output table 122, such that source code modifier 146 is able to ascertain the point at which a compilation started to fail (and thereby make an educated guess about where a targeted code change could be made to further isolate the error and recompile).

Source code modifier 146 uses data received from the checkpoint narrowing engine 144 to change the pre-processed source code 150 and create new versions. A new compiler iteration is then started after modifying the pre-processed source code 150 in a targeted manner which fixes the problem and thus isolates the failing line of code.

Figure 2:
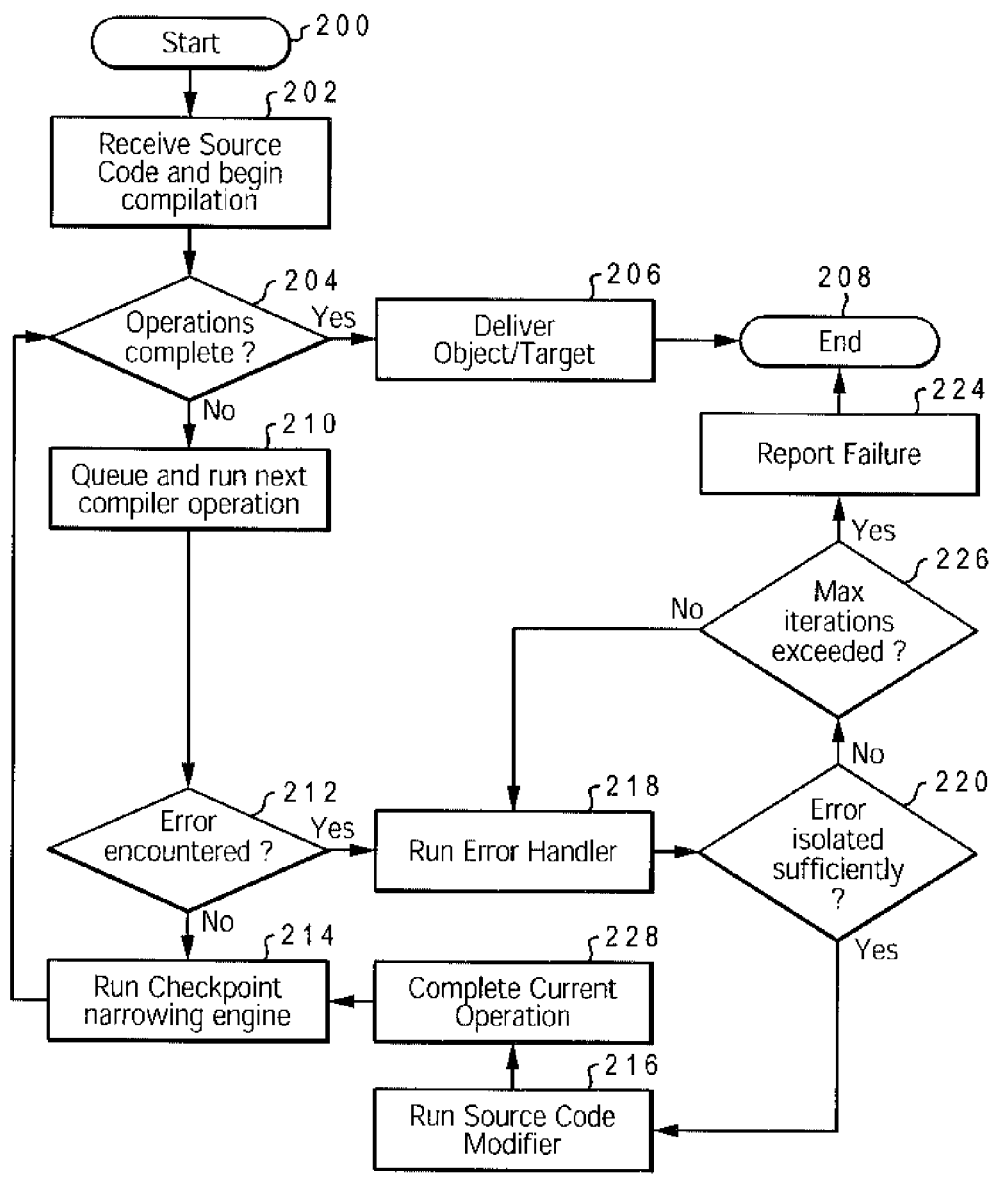
FIG. 2 is a high-level logical flowchart of a process for performing error isolation, optimization and resolution during compilation.

Turning now to FIG. 2, a high-level logical flowchart of a process for performing error isolation, optimization and resolution is depicted. The process starts at step 200 and then proceeds to step 202, which depicts compiler 172 receiving source code 120 and beginning compilation. The process next moves to step 204. Step 204 illustrates compiler 172 determining whether the operations of preprocessor 132, lexer/scanner 134, parser 136, intermediate code generator 138, optimizer 140 and code generator 142 are complete. If compiler 172 determines that the operations of preprocessor 132, lexer/scanner 134, parser 136, intermediate code generator 138, optimizer 140 and code generator 142 are complete, then the process proceeds to step 206, which depicts compiler 172 delivering object 148 to verification environment 124, for use by simulator 156. The process then ends at step 208.

Returning to step 204, if compiler 172 determines that the operations of preprocessor 132, lexer/scanner 134, parser 136, intermediate code generator 138, optimizer 140 and code generator 142 are not complete, then the process next moves to step 210. Step 210 depicts compiler 172 queuing and running a next operation from among the set of preprocessor 132, lexer/scanner 134, parser 136, intermediate code generator 138, optimizer 140 and code generator 142. The process then proceeds to step 212, which illustrates compiler 172 determining whether the operation run in step 210 has encountered an error. If compiler 172 determines that the operation run in step 210 has not encountered an error, then the process proceeds to step 214, which depicts compiler 172 running checkpoint narrowing engine 144. The process then returns to step 204, which is described above. Returning to step 212, if compiler 172 determines that the operation run in step 210 has encountered an error, then the process next moves to step 218.

Step 218 illustrates compiler 172 running error handler 152. The process then moves to step 220, which depicts compiler 172 determining whether the error encountered in step 212 has been sufficiently isolated by error handler 152. Sufficient isolation will entail comparing to a threshold value, which in a preferred embodiment is three lines, the number of lines of code in which the error is suspected. Alternative embodiments will use different threshold values of a number of lines for sufficient isolation without departing from the scope of the present invention. If compiler 172 determines that the error encountered in step 212 has been sufficiently isolated, then the process proceeds to step 216. Step 216 depicts compiler 172 running source code modifier 146. The process next moves to step 228, which illustrates compiler 172 completing the operation queued in step 204. The process then returns to step 214, which is described above.

Returning to step 220, if compiler 172 determines that the error encountered in step 212 has not been sufficiently isolated, the process next moves to step 226, which illustrates compiler 172 determining whether the maximum number of iterations has been exceeded. In a preferred embodiment of the present invention, the maximum number of iterations is eight. Alternative embodiments for specific purposes will use different maximum numbers of iterations without departing from the scope of the present invention. If compiler 172 determines that the maximum number of iterations has not been exceeded, then the process returns to step 218, which is described above.

Returning to step 226, if compiler 172 determines that the maximum number of iterations has been exceeded, then the process proceeds to step 224. Step 224 illustrates compiler 172 reporting a failure by logging a result to output table 122 or sending a message to a user across user I/O 114.

Using the present invention, compiler 172 performs steps of the compiling process (through the invocation of preprocessor 132, lexer/scanner 134, parser 136, intermediate code generator 138, optimizer 140, and code generator 142) until a failure is encountered, and then, in cases where the problem area is not sufficiently isolated, uses source code modifier 146 to modify the pre-processed source code 150 being compiled (in an attempt to isolate the failing area). Compiler 172 then resumes compilation and determines if the compile succeeds with suspect code removed from source code 120. By iterating a reasonable number of times, the present invention provides superior isolation, optimization and correction to the user. If compiler 172 is unable to sufficiently narrow the failure to an exact line of code, compiler 172 performs several iterations of a four-step process. Source code modifier 146 identifies suspect code by analyzing past versions of pre-processed source code 150, which lead to successful compilations, or by making an educated guess where the problem is occurring based on lexicographical processing or custom rules which are defined specifically for given types of compilation failure.

Pre-processed source code 150 is changed (e.g., suspect lines are edited and removed, or in some cases code is added) by compiler 172. Compiler 172 then partially recompiles the test code area of pre-processed source code 150 with suspect code removed. If compiler 172 successfully completes a test compile or is able to compile with fewer errors using the test code area of pre-processed source code 150 with suspect code removed, then compiler 172 records to output table 122 that the error has been narrowed. If compiler 172 narrows the problem further during subsequent compilations, compiler 172 reports an isolated problem area to the user or suggests a way to correct the problem to the user through user I/O 114.

An example of the operation of the present invention is provided below for a compilation of "C" code. However, the present invention is not restricted to improving the compilation of "C" code, but may be applicable to a multiplicity of compilation processes for different languages. The example source code 120 below contains omitted bracket syntax at lines 603 and 604. The example illustrates the operation of compiler 172 in accordance with a preferred embodiment of the present invention.

```
570        memset(machine, 0, 52*4);
571        //
--------------------------------------------------------------------
572        reserve_bits(machine,machine_a_spec,    3);
573        reserve_bits(machine,machine_b_spec,    1);
574        reserve_bits(machine,machine_c_spec,    1);
575        for(i=0; i <10; i++){
576             reserve_bits(machine,state_spec[i], 2);
577        }
578        ///
--------------------------------------------------------------------
579        for(i=0; i < 2; i++){
580             for(k=0; k < num_machines; k++){
581                  if(state_spec [k] [i] == 0xffffffff) {
582                       if(pick_state_from machine(machine, state) != 0) {
return_LINE_; }
583                            machine states [k] [i] =state;
584                       } else {
585                            machine_states [k] [i] = state_spec [k] [i] ;
586                       }
587                  }
588             }
589             if(pick_state_from machine(machine, state) != 0){ return_LINE_; }
590
591
592             for(j=0; j < 3; j++){
593                  if(pick_state_from machine(machine, state) != 0){ return_LINE_;
}
594                  if(j == 0) { spec.= machine_a_spec; k=3; }
595                  if(j == 1) { spec = machine_c_spec; k=1; }
596                  if(j == 2) { spec = machine_b_spec; k=1; }
```

```
597                for(i=0; i < k; i++){
598                    if(spec [i] == 0xffffffff) {
599                        if(pick_state_from machine(machine, state) != 0) {
return __LINE__; }
600                        end_state[i]=state;
601                    } else {
602                        end_state [i] =spec [i] ;
603                    }
                        /* location of missing bracket*/
604            }
605
```

In response to the example of source code 120 above, compiler 172 would exhibit the following initial errors.

```
g++ -g -c -o p.o p.C
p.C: In function 'unsigned int play_holdem(unsigned int)':
p.C:679: error: a function-definition is not allowed here before '{' token
p.C:679: error: expected ',' or ';' before '{' token
p.C:684: error: a function-definition is not allowed here before '{' token
p.C:684: error: expected ',' or ';' before '{' token
p.C:706: error: a function-definition is not allowed here before '{' token
p.C:706: error: expected ',' or ';' before '{' token
p.C:723: error: a function-definition is not allowed here before '{' token
p.C:723: error: expected ',' or ';' before '{' token
p.C:787: error: a function-definition is not allowed here before '{' token
p.C:787: error: expected ',' or ';' before '{' token
p.C:802: error: expected primary-expression before "void"
p.C:802: error: expected ';' before "void"
p.C:885: error: a function-definition is not allowed here before '{' token
p.C:885: error: expected ',' or ';' before '{' token
p.C:886: error: a function-definition is not allowed here before '{' token
p.C:886: error: expected ',' or ';' before '{' token
p.C:887: error: a function-definition is not allowed here before '{' token
p.C:887: error: expected ',' or ';' before '{' token
p.C:904: error: a function-definition is not allowed here before '{' token
p.C:904: error: expected ',' or ';' before '{' token
p.C:951: error: expected '}' at end of input
make: *** [p.o] Error 1
```

Compiler 172 has identified a suspect line in source code 120 within the range 570-605 and will now attempt to remove the suspect line from the compilation and recompile in an attempt to better isolate the problem area. The source code is modified using standard string manipulation or text manipulation methods. The information obtained during compilation would provide the necessary lexical understanding for the string manipulation/modification to be programmed into logical routines. The resulting modified source code is provided below.

```
#if 0
570     memset(machine, 0, 52*4);
571     //
---------------------------------------------------------------------
572     reserve_bits(machine,machine_a_spec, 3);
573     reserve_bits(machine,machine_b_spec, 1);
574     reserve_bits(machine,machine_c_spec, 1);
575     for (i=0; i <10; i++){
576     reserve_bits(machine,state_spec[i], 2);
577     }
578     ///
---------------------------------------------------------------------
579     for(i=0; i < 2; i++){
580         for(k=0; k < num_machines; k++) {
581             if(state_spec [k] [i] == 0xffffffff) {
582                 if(pick_state_from machine(machine, state) != 0){
return_LINE_; }
583                 machine_states [k] [i] = state;
584             } else {
585                 machine_states [k] [i] = state_spec [k] [i];
586             }
587         }
588     }
589     if(pick_state_from machine(machine, state) ! = 0) { return_LINE_; }
590
591
592     for(j=0; j < 3; j++) {
593         if(pick_state_from machine(machine, state) ! = 0) { return_LINE_;
}
594         if(j == 0){ spec = machine_a_spec; k=3; }
595         if(j == 1){ spec = machine_c_spec; k=1; }
596         if(j == 2){ spec = machine_b_spec; k=1; }
597         for(i=0; i < k; i++){
598             if(spec [i] == 0xffffffff) {
599                 if(pick_state_from machine(machine, state) ! = 0) {
```

-continued

```
return__LINE__; }
    600                    end_state [i] =state;
    601              } else {
    602                    end_state [i] =spec [i];
    603              }
                    /* location of missing bracket*/
    604        }
    605
#endif
```

Compiler 172 compiles the modified source code given above, and the code compiles successfully, producing the output depicted below:

```
make
g++ -g -c -o p.o p.C
g++ -g -o p p.o
```

Compiler 172 then attempts further isolation with a compile of the code given below:

Compiler 172 succeeds in the recompile, isolating the error to lines 592-605 resulting in the output described below:

```
make
g++ -g -c -o p.o p.C
g++ -g -o p p.o
```

Compiler 172 then attempts further isolation by compiling the code given below, with a narrower error range:

```
    570        memset(machine, 0, 52*4);
    571        //
------------------------------------------------------------------------
    572        reserve_bits(machine,machine_a_spec, 3);
    573        reserve_bits(machine,machine_b_spec, 1);
    574        reserve_bits(machine,machine_c_spec, 1);
    575        for (i=0; i <10; i++){
    576            reserve_bits(machine,state_spec[i], 2);
    577        }
    578        ///
------------------------------------------------------------------------
    579        for(i=0; i < 2; i++){
    580            for(k=0; k < num_machines; k++) {
    581                if(state_spec [k] [i] == 0xffffffff) {
    582                    if(pick_state_from machine(machine, state) != 0){
return__LINE__; }
    583                        machine_states [k] [i] = state;
    584                    } else {
    585                        machine_states [k] [i] = state_spec [k] [i];
    586                    }
    587                }
    588            }
    589            if(pick_state_from machine(machine, state) ! = 0) { return__LINE__; }
    590
    591
#if 0
    592            for(j=0; j < 3; j++) {
    593                if(pick_state_from machine(machine, state) ! = 0) { return__LINE__;
}
    594                if(j == 0){ spec = machine_a_spec; k=3; }
    595                if(j == 1){ spec = machine_c_spec; k=1; }
    596                if(j == 2){ spec = machine_b_spec; k=1; }
    597                for(i=0; i < k; i++){
    598                    if(spec [i] == 0xffffffff) {
    599                        if (pick_state_from machine(machine, state) ! = 0) {
return__LINE__; }
    600                            end_state [i] =state;
    601                    } else {
    602                            end_state [i] =spec [i];
    603                    }
                        /* location of missing bracket */
    604        }
    605
#endif
```

```
570        memset(machine, 0, 52*4);
571        //
--------------------------------------------------------------------------
572        reserve_bits(machine,machine_a_spec, 3);
573        reserve_bits(machine,machine_b_spec, 1);
574        reserve_bits(machine,machine_c_spec, 1);
575        for (i=0; i <10; i++){
576            reserve_bits(machine,state_spec[i], 2);
577        }
578        ///
--------------------------------------------------------------------------
579        for(i=0; i < 2; i++){
580            for(k=0; k < num_machines; k++) {
581                if(state_spec [k] [i] == 0xffffffff) {
582                    if(pick_state_from machine(machine, state) != 0){
return_LINE_; }
583                        machine_states [k] [i] = state;
584                    } else {
585                        machine_states [k] [i] = state_spec [k] [i];
586                    }
587                }
588            }
589            i (pick_state_from machine(machine, state) ! = 0) { return_LINE_; }
590
591
592            for(j=0; j < 3; j++) {
593                if(pick_state_from machine(machine, state) ! = 0) { return_LINE_;
}
594                if(j == 0){ spec = machine_a_spec; k=3; }
595                if(j == 1){ spec = machine_c_spec; k=1; }
596                if(j == 2){ spec = machine_b_spec; k=1; }
#if 0
597                for(i=0; i < k; i++){
598                    if(spec [i] == 0xffffffff) {
599                        if(pick_state_from machine(machine, state) ! = 0) {
return_LINE_; }
600                            end_state [i] =state;
601                        } else {
602                            end_state [i] =spec [i];
603                        }
#endif
                                    /* location of missing bracket */
604                }
605
```

As a final step, source code modifier 146 attempts to insert the missing bracket at the suspect location to try to narrow down the failure to the exact line number of the failure in source code 120 at lines 603-604. For example, compiler 172 returns the error message: "Error Line #604: A closing } for the block that began on line 597 is missing." As a further or alternative step, the compiler will additionally modify the input source code to contain the final closing bracket, recompile to verify success, and then report the error to the user with the results of the proposed change.

In the example given above, the line number of the failing line of code in source code 120 has been isolated by compiler 172, using an iterative approach, by isolating suspect lines of code and then testing to see if the removal of those lines allows the compile to succeed or improve. In this way, a more accurate error report in output table 122 can be returned to the user through user I/O 114. Instead of merely indicating an error in lines 679-951, as would be the case under the prior art, the present invention allows compiler 172 to indicate a more specific error at a specific line.

The identification of suspect code lines can be accomplished using a number of existing algorithms, as well as others to be invented later. A preferred embodiment, during compilation by compiler 172, saves the pre-processed source code 150 up to N times and retains in output table 122 the results of whether or not compilation of each version of pre-processed source code 150 was successful. Output table 122 associates a compile result with each version of pre-processed source code 150, as is illustrated in the example content below:

.p.ii.2005.07.28.1401.16.failure
.p.ii.2005.07.28.1342.22.success
.p.ii.2005.07.28.1305.32.success
.p.ii.2005.07.28.1241.01.success Compiler 172 uses the above-given version data from output table 122 to determine what parts of source code 120 contain the problem by analyzing and comparing the results of iterative compilations for different versions of pre-processed source code 150, such as .p.ii.2005.07.28. 1401.16.failure and .p.ii.2005.07.28.1342.22.success. Compiler 172 then uses the information that it found during that comparison to identify suspect code lines and begins the process of iteration, recompilation and testing in an attempt to better isolate the failure and/or correct the problem.

The present invention provides an iterative, partial, automatic recompilation of source code to isolate detected errors with automatic insertion or change of source code during compilation upon error detection. Compiler 172 also supports performing out-of-order compilation for the isolation of detected errors. The present invention provides a compiler 172 that improves upon the prior art's simple compilation of a source file one time and reporting a potentially cryptic error(s), by iterating N number of times after the first failure in an attempt to correct the failure by deleting suspect lines (and by inserting code in some cases to pre-processed source code 150) near suspect code lines and recompiling. As a result, compiler 172 is able to more accurately report errors to the user or be able to suggest the solution to the user of where the code is actually broken. Compiler 172 supports a partial recompile during the recompilation iteration steps. As pre-processed source code 150 is processed linearly from line 0 to N, at certain points in time, the compiler 172 completes compilation for a function successfully and records a checkpoint to output table 122 to indicate success.

During linear processing of pre-processed source code 150 by compiler 172, if an error is encountered at line K, the compiler 172 refrains from recompiling pre-processed source code 150 from line 1-line K, but instead returns to the line of previous confirmed checkpoint of pre-processed source code 150 indicated in output table 122, where confirmation requires 2 successful checkpoints in a row, and then performs modifications on suspect code lines and whole algorithms.

Compiler 172 implements several rules and methods to identify and test the removal or modification of suspect code lines from pre-processed source code 150, and changes pre-processed source code 150 during compilation in an effort to better isolate compilation failures, and/or correct the failure. Suspect code lines within pre-processed source code 150 are sometimes temporarily removed by compiler 172 from a recompilation test iteration during attempts to better isolate the failure by using a technique similar to "#if 0 . . . suspect lines #endif". Suspect code lines from pre-processed source code 150 are sometimes temporarily modified or code may be inserted (for example, inserting a missing "}", ")", "(", or other syntax which makes sense for the programming language being compiled) by compiler 172 within the region of the suspect code line of pre-processed source code 150 during attempts to better isolate the failure through recompilation/iteration. Suspect code lines within pre-processed source code 150 are sometimes identified by compiler 172 using a rule specifically customized for a specific type of compilation error (for example, the "missing }" error) and compiler 172 employs lexicographical techniques to identify areas in the code where the addition of a missing "}" or ")" "(" "{" etc., could correct the failure. Suspect code lines within pre-processed source code 150 are sometimes identified by analyzing past successful compilations and saved versions of pre-processed source code 150 (stored and maintained by compiler 172). In this way, compiler 172 identifies the areas of the source code 120 that have changed the most since the last successful compilation, and is able to make decisions based on the changes.

During compilation by compiler 172, as various structures, declarations and definitions are completed, compiler 172 ascertains whether compilation is progressing successfully or not, along with expected results during compilation of a given structure, code block or data type. Thus, compiler 172 generates expectations of what it should find in pre-processed source code 150 during various stages of the compilation. For example, if compiler 172 is compiling a function definition from within source code 150, compiler 172 expects to see a completed function definition and closing bracket, followed by another function definition. Similarly, while compiling function declarations, compiler 172 expects a declaration to close with a semicolon followed by another function declaration. By making various assumptions about expectations at a point of failure in pre-processed source code 150, compiler 172 isolates areas in source code 120 that contain an error, shows what the missing/incorrect syntax was, and what changes by compiler 172 will fix the problem. Then, through iterative testing and recompilation, compiler 172 verifies or disproves whether it was able to better isolate the problem or actually correct the problem within source code 120.

Compiler 172 selectively attempts to skip forward in the source code 120 to identify an area where the effects of an error end, and then proceed backward from that point during the testing and recompilation process. For example, compiler 172 skips forward to an area in source code 120 that appears to be a potentially correct function definition. If compiler 172 is able to verify that area is compilable in source code 120, the isolation will provide evidence that the actual code bug existed in lines prior to a particular function definition.

The present invention reduces the volume of error report messages seen in the prior art, which are at times cryptic and are not always specific as to the exact nature of the underlying problem. Using the present invention, compilers need not report thousands of unrelated error codes and failures when there potentially are only one or two actual problems in the source code. The performance of a marginal amount of additional compiler operation by the present invention saves the user a substantial amount of time. Because of the high value of development time spent on compiling and debugging problems, the present invention improves efficiency by reducing the time spent needlessly investigating cryptic or misleading error messages through better error report isolation and correction of compilation failures. The present invention, therefore, reduces the time spent developing reliable code.

While the invention has been particularly shown as described with reference to a preferred embodiment, it will be understood by those skilled in the art that various changes in form and detail may be made therein without departing from the spirit and scope of the invention. It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communication links.

What is claimed is:

1. A method for correcting errors in code in a data processing system including a processor, said method comprising:
    the processor performing on source code a selected compilation operation from among a set of compilation operations;
    responsive to encountering a source code error in said source code during the selected compilation operation, the processor running an error handler to isolate said source code error in the source code utilizing data logged for said compilation operation; and
    responsive to determining that said error handler has not sufficiently isolated said source code error, the processor running a source code modifier to modify a portion of said source code selected by reference to said data logged for said compilation operation.

2. The method of claim 1, wherein said method further comprises the step of, responsive to determining that compiling said set of compilation operations is complete, the processor delivering an object file.

3. The method of claim 1, wherein said method further comprises the step of, in response to determining that said source code error was not encountered in said selected compilation operation, the processor running a checkpoint narrowing engine to log data indicating a clean section of said source code.

4. The method of claim 1, wherein said method further comprises the step of, in response to determining that a maximum number of iterations of the error handler has been exceeded, the processor reporting a failure.

5. The method of claim 1, wherein said step of running said source code modifier to modify said portion of said source code selected by reference to said data logged for said compilation operation further comprises the step of the processor temporarily removing a suspect section of said source code.

6. The method of claim 1, wherein said step of running said source code modifier to modify said portion of said source code selected by reference to said data logged for said compilation operation further comprises the step of the processor temporarily inserting an additional unit of code into said source code.

7. The method of claim 1, wherein said step of running said source code modifier to modify said portion of said source code selected by reference to said data logged for said compilation operation further comprises the step of the processor performing a file comparison operation to identify a source of said source code error.

8. A data processing system for performing error isolation and correction, said data processing system comprising:
    a processor; and
    data storage coupled to the processor, the data storage including program code that causes the processor to perform:
        performing on source code a selected compilation operation from among a set of compilation operations;
        responsive to encountering a source code error in said source code during the selected compilation operation, running an error handler to isolate said source code error in the source code utilizing data logged for said compilation operation; and
        responsive to determining that said error handler has not sufficiently isolated said source code error, running a source code modifier to modify a portion of said source code selected by reference to said data logged for said compilation operation.

9. The system of claim 8, wherein said program code further causes the processor to perform:
    responsive to determining that compiling said set of compilation operations is complete, delivering an object file.

10. The system of claim 8, wherein said program code further causes the processor to perform:
    in response to determining that said source code error was not encountered in said selected compilation operation, running a checkpoint narrowing engine to log data indicating a clean section of said source code.

11. The system of claim 8, wherein said program code further causes the processor to perform:
    in response to determining that a maximum number of iterations of the error handler has been exceeded, reporting a failure.

12. The system of claim 8, wherein running said source code modifier to modify said portion of said source code selected by reference to said data logged for said compilation operation further comprises temporarily removing a suspect section of said source code.

13. The system of claim 8, wherein running said source code modifier to modify said portion of said source code selected by reference to said data logged for said compilation operation further comprises temporarily inserting an additional unit of code into said source code.

14. The system of claim 8, wherein running said source code modifier to modify said portion of said source code selected by reference to said data logged for said compilation operation further comprises performing a file comparison operation to identify a source of said source code error.

15. A machine-readable storage medium having a plurality of instructions stored therein, wherein said plurality of instructions, when processed by said machine, causes said machine to perform:
    performing on source code a selected compilation operation from among a set of compilation operations;
    responsive to encountering a source code error in said source code during the selected compilation operation, running an error handler to isolate said source code error in the source code utilizing data logged for said compilation operation; and
    responsive to determining that said error handler has not sufficiently isolated said source code error, running a source code modifier to modify a portion of said source code selected by reference to said data logged for said compilation operation.

16. The machine-readable medium of claim 15, wherein said plurality of instructions further causes the machine to perform:
    responsive to determining that compiling said set of compilation operations is complete, delivering an object file.

17. The machine-readable medium of claim 15, wherein said plurality of instructions further causes the machine to perform:
    in response to determining that said error was not encountered in said selected compilation operation, running a checkpoint narrowing engine to log data indicating a clean section of said source code.

18. The machine-readable medium of claim 15, wherein said plurality of instructions further causes the machine to perform:
    in response to determining that a maximum number of iterations has been exceeded, reporting a failure.

19. The machine-readable medium of claim 15, wherein running said source code modifier to modify said portion of said source code selected by reference to said data logged for said compilation operation further comprises temporarily removing a suspect section of said source code.

20. The machine-readable medium of claim 15, wherein running said source code modifier to modify said portion of said source code selected by reference to said data logged for said compilation operation further comprises temporarily inserting an additional unit of code into said source code.

* * * * *